United States Patent [19]

Krawczyk

[11] 3,782,635

[45] Jan. 1, 1974

[54] REVERSE FLOW LAWN SPRINKLER HOSE ASSEMBLY

[76] Inventor: Miecislaus Krawczyk, 3859 E. Whittaker, Cudahy, Wis. 53110

[22] Filed: Oct. 11, 1972

[21] Appl. No.: 291,961

[52] U.S. Cl. ............ 239/199, 137/355.17, 239/450, 239/562
[51] Int. Cl. ............................................ A01q 25/00
[58] Field of Search .................. 239/199, 213, 450, 239/562, 547; 137/355.16, 355.17, 355.19

[56] References Cited
UNITED STATES PATENTS

| | | | |
|---|---|---|---|
| 3,493,009 | 2/1970 | Richardson | 137/355.17 |
| 2,730,404 | 1/1956 | Meisinger et al. | 239/450 X |
| 2,747,935 | 5/1956 | Szantay | 239/450 UX |

Primary Examiner—Lloyd L. King
Assistant Examiner—Andres Kashnikow
Attorney—Gerald P. Welch

[57] ABSTRACT

A flat lawn hose of the fine sprinkling type is normally attached with its inlet end to a length of conventional lawn hose. The present fine sprinkling hose is normally on a reel and has the inlet end thereof at the free end thereof and is flanked by a pair of hose elements terminating in a union which is centrally united with the free end of the fine sprinkling hose. The pair of hose elements are also wound on the reel and are coupled with the source of water. The user pulls out a selected length of fine sprinkler, affixes a hose clamp and only the selected length of fine sprinkling hose need be used and in its most convenient accessibility.

6 Claims, 3 Drawing Figures

PATENTED JAN 1 1974　　　　　　　　　　　　　　　3,782,635

REVERSE FLOW LAWN SPRINKLER HOSE ASSEMBLY

BRIEF SUMMARY OF THE INVENTION

A fine sprinkling hose of the type disclosed is usually attached to the free end of a garden hose of the conventional character which necessitates the employment of the full length of the fine sprinkler hose, even when only a very short length might be all that is needed. The invention resides in a combination of a reel on a hand truck or the like for mobility, fine sprinkler hose wound on said reel with the closed end attached to the anchor end and the water entry orifice at the free end thereof. A second pair of hoses are wound on the reel flanking the fine sprinkler hose, with the reel end of said pair of hoses communicating with rotatable couplings concentric with the said reel, said couplings communicating with the source of water. A triple orificed M union connects the discharge ends of the flanking hoses with the inlet orifice of the fine sprinkler hose. A hose clamp or other appropriate means is employed to shorten the fine sprinkler hose to a selected length.

DETAILED DESCRIPTION

Figure 1:
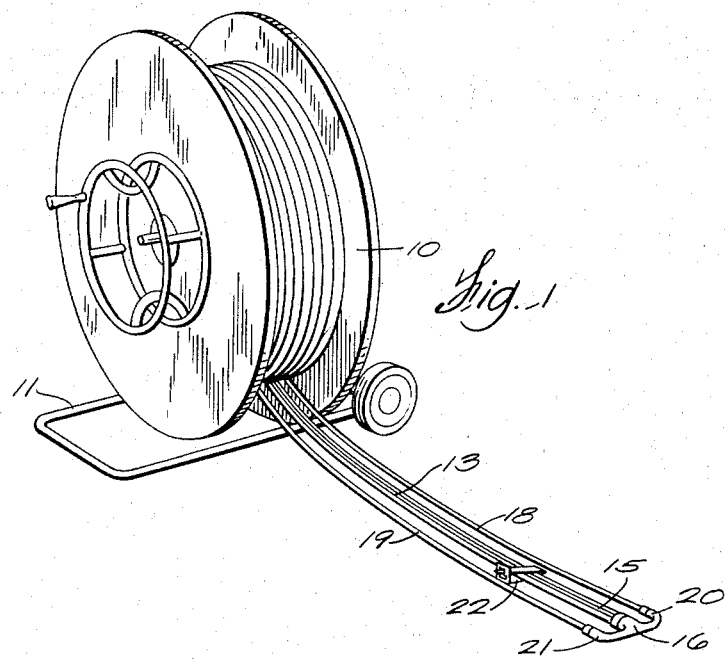
FIG. 1 is a view in perspective of a Reverse Flow Lawn Sprinkling Hose Assembly embodying the invention.
Figure 2:
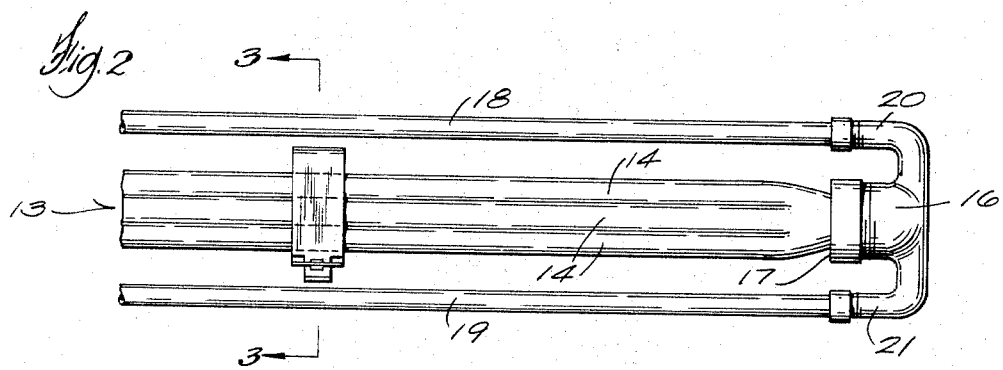
FIG. 2 is a fragmentary plan view of the hose elements and one form of clamping means.
Figure 3:
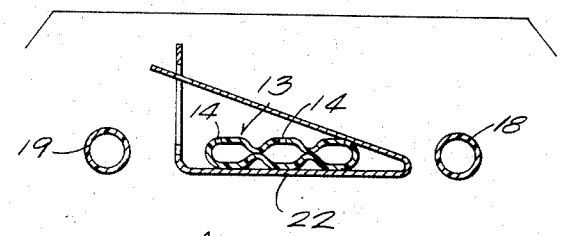
FIG. 3 is a cross-sectional view taken on line 3—3 of FIG. 2.

A reel 10 is rotatably mounted on a hand truck 11, and is connected by a length of hose 12, (not shown) to the water supply. A length of fine sprinkling hose 13 of flat conventional type having three rows of fine apertures as at 14 in one face thereof. The flat hose 13 has the closed end thereof anchored to the reel core for winding thereon. The hose 13 is withdrawn from the reel 10 by the inlet end 15 thereof which is coupled with a multiple union 16 at 17. A pair of water supply hoses 18 and 19 flank the hose 13 and feed water through the lateral members 20 and 21 of the union 16. A hose clamp 22 or other appropriate means is used to shorten the fine sprinkler hose 13 to the appropriate watering length desired.

Having thus described the invention, what is claimed and desired to be secured by Letters Patent of the United States, is:

1. Sprinkling apparatus comprising a water supply hose having one end connectable with a water source, a fine sprinkler hose having a plurality of fine discharge apertures, said fine sprinkler hose having an inlet, a union connecting said inlet of said fine sprinkling hose to said other end of said water supply hose to afford fluid communication from said supply hose to said sprinkler hose and to maintain said supply hose and said sprinkler hose in generally parallel relationship to afford common withdrawal of said hoses from a storage device, and clamp means spaced from said union on the fine sprinkler hose to limit the lineal operational portion of said fine sprinkler hose.

2. Sprinkling apparatus as in claim 1, and wherein said clamp means is adjustably movable on said fine sprinkling hose to vary the lineal operational portion of said fine sprinkler hose.

3. Sprinkling apparatus as in claim 1, and including a plurality of clamp means each spaced along the fine sprinkler hose for providing multiple and different operational lengths for said fine sprinkler hose.

4. Sprinkling apparatus in accordance with claim 1 including a second water supply hose connectable to said union and in communication with said fine sprinkler hose.

5. Sprinkling apparatus in accordance with claim 1 in combination with a hose reel, said water supply hose and said fine sprinkling hose being wrapped around said reel for common withdrawal of both of said hoses from said reel.

6. Sprinkling apparatus in accordance with claim 5 wherein said hoses have free ends and said union is connected to the free end of said supply hose and said fine sprinkler hose and said clamp means is adjustably movable from said free ends toward said reel to vary the length of sprinkling hose supplied with water.

* * * * *